(12) United States Patent
Rodatz et al.

(10) Patent No.: US 7,798,265 B2
(45) Date of Patent: Sep. 21, 2010

(54) METHOD AND DEVICE FOR THE OPERATION OF A MOTOR VEHICLE

(75) Inventors: Paul Rodatz, Landshut (DE); Norbert Sieber, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 461 days.

(21) Appl. No.: 11/903,971

(22) Filed: Sep. 25, 2007

(65) Prior Publication Data

US 2008/0110686 A1 May 15, 2008

(30) Foreign Application Priority Data

Sep. 28, 2006 (DE) .................. 10 2006 045 891

(51) Int. Cl.
*B60K 6/442* (2007.10)
*B60W 20/00* (2006.01)
*B60W 10/06* (2006.01)
*B60W 10/08* (2006.01)

(52) U.S. Cl. .............. 180/65.23; 180/65.275; 180/65.28; 180/65.285

(58) Field of Classification Search .......... 180/65.21, 180/65.225, 65.23, 65.24, 65.265, 65.275, 180/65.28, 65.285, 65.29

See application file for complete search history.

(56) References Cited

U.S. PATENT DOCUMENTS

| 6,123,163 | A  | * | 9/2000 | Otsu et al. ................ 180/65.8 |
| 6,389,807 | B1 | * | 5/2002 | Suzuki et al. ............... 60/285 |
| 6,504,259 | B1 | * | 1/2003 | Kuroda et al. ............ 290/40 C |
| 6,718,758 | B1 | * | 4/2004 | Suzuki ....................... 60/300 |
| 7,077,224 | B2 | * | 7/2006 | Tomatsuri et al. ...... 180/65.235 |
| 7,478,691 | B2 | * | 1/2009 | Yamaguchi et al. ...... 180/65.28 |
| 2002/0096886 | A1 | * | 7/2002 | Schmitz et al. ......... 290/40 C |
| 2003/0172643 | A1 | * | 9/2003 | Suzuki ....................... 60/284 |
| 2007/0007056 | A1 | * | 1/2007 | Bowers et al. ............ 180/65.2 |

FOREIGN PATENT DOCUMENTS

| DE | 196 29 552 C1 | 12/1997 |
| DE | 10 2004 023 503 A1 | 12/2005 |
| DE | 10 2004 052 772 A1 | 5/2006 |
| EP | 0 601 300 A1 | 6/1994 |

* cited by examiner

*Primary Examiner*—Hau V Phan
*Assistant Examiner*—John R Olszewski
(74) *Attorney, Agent, or Firm*—King & Spalding L.L.P.

(57) ABSTRACT

For operation of a motor vehicle with at least one first drive motor, at least one electrical consumer of the first drive motor is operated in an energy-saving mode after autonomous switching-off of said first drive motor. The autonomous switching-off of the first drive motor is independent of any intentional switching-off of the first drive motor by a driver of the motor vehicle.

16 Claims, 2 Drawing Sheets

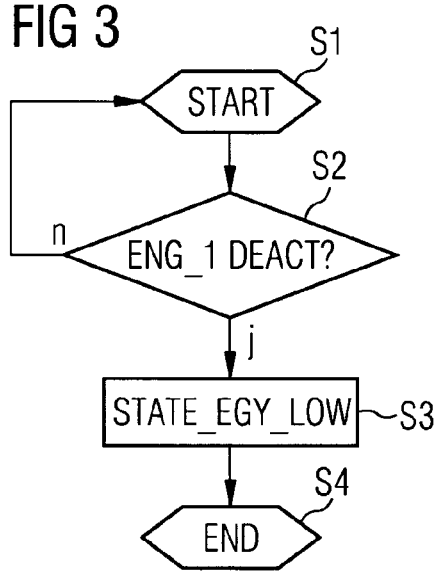
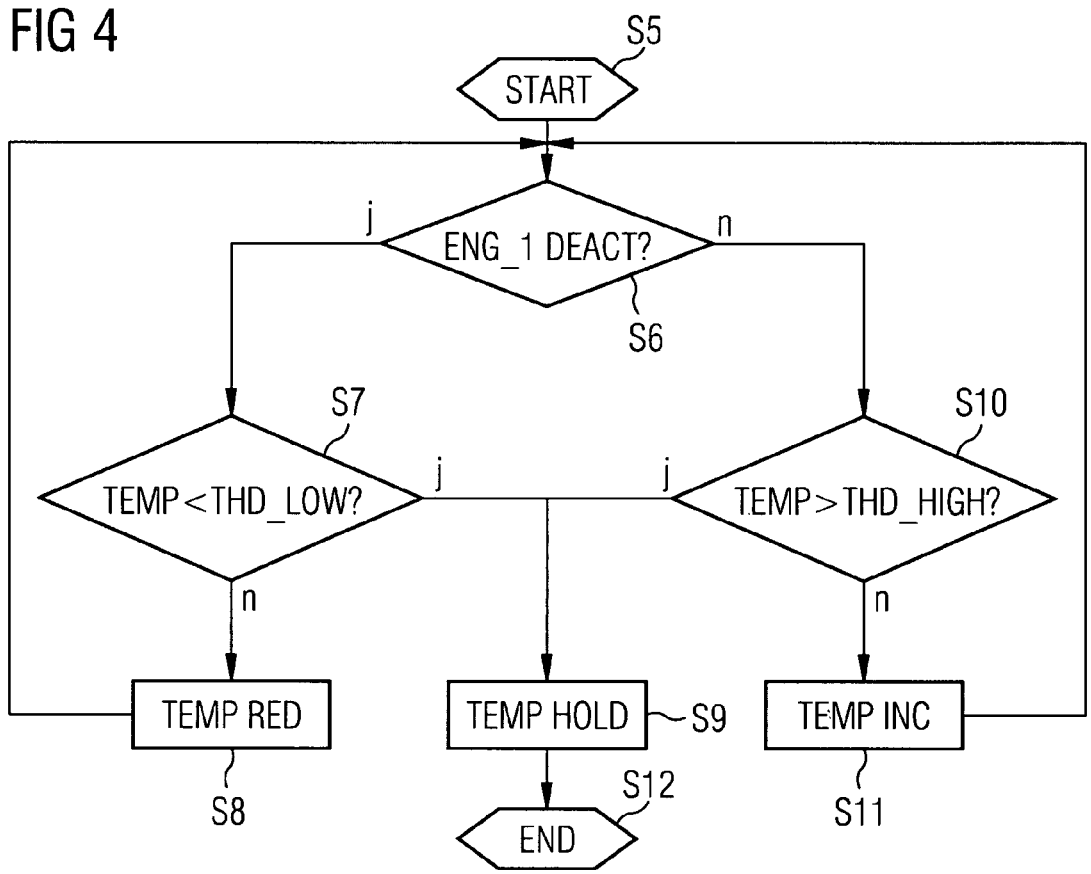

METHOD AND DEVICE FOR THE OPERATION OF A MOTOR VEHICLE

CROSS REFERENCE TO RELATED APPLICATIONS

This application claims priority of German Patent application No. 10 2006 045 891.5 filed Sep. 28, 2006, which is incorporated by reference herein in its entirety.

FIELD OF INVENTION

The invention relates to a method and a device for the operation of a motor vehicle. The motor vehicle comprises at least a first drive motor.

BACKGROUND OF THE INVENTION

In modern motor vehicles, operating statuses may exist in which a drive motor of the motor vehicle is switched off autonomously. In this connection, "autonomously" means that the switching-off of the drive motor is independent of any intention by the motor vehicle's driver to switch off the drive motor. The deliberate switching-off of the internal combustion engine consists, for example, of the switching-off of the drive motor by means of an ignition key, and the motor vehicle's ignition. The drive motor can, for example, be switched off autonomously, for example by means of a control device belonging to the motor vehicle when the drive motor is temporarily not required. The drive motor is not required, for example, if the motor vehicle is stationary, and operating in neutral. The drive motor can further be switched off autonomously, for example, if the motor vehicle has a hybrid drive system with two drive motors, and only one of the two drive motors needs to be active.

SUMMARY OF INVENTION

The object of the invention is to create a method and a device for operating a motor vehicle that enables the energy-saving operation of said motor vehicle.

The object is achieved by means of the features of the independent claims. Advantageous embodiments of the invention are specified in the subclaims.

The invention is characterized by a method and a device for the operation of a motor vehicle. The motor vehicle has at least one first drive motor. For operation of the motor vehicle, after autonomous switching-off of the first drive motor, at least one electrical consumer of the first drive motor is operated in an energy-saving mode. The autonomous switching-off of the first drive motor is independent of any deliberate switching-off of the first drive motor by a driver of the motor vehicle.

This enables, in a simple manner, the energy-saving operation of the motor vehicle. Further, an electrical consumer of the motor vehicle which requires a prescribed start-up time until it operates in the intended manner can, in the case of autonomous actuation of the internal combustion engine, be more rapidly ready for operation, starting from energy-saving mode, than is the case without energy-saving mode. In the energy-saving mode, the power required to operate the electrical consumer is advantageously lower than is the case with normal operation of said electrical consumer.

In an advantageous embodiment of the method, the first drive motor is switched off autonomously if the first drive motor is operated in neutral, and if the motor vehicle's wheels are stationary. This makes it possible, in a particularly simple and effective way, for the motor vehicle to be operated in an energy-saving manner. For example a control device of the motor vehicle switches the first drive motor off autonomously if the motor vehicle is standing, while not in gear, at a red stop-light. Advantageously, when a gear is engaged, the first drive motor is then started autonomously.

In a further advantageous embodiment of the method, the first drive motor is autonomously switched off if a second drive motor of the motor vehicle is started. The first drive motor can, for example, be an internal combustion engine. The second drive motor can, for example, be an electric motor. The motor vehicle then has a hybrid drive comprising the internal combustion engine and the electric motor. This makes it possible in a particularly efficient way to operate the hybrid drive, which is, as a rule, designed for lower energy consumption, in an even more energy-saving manner.

In a further advantageous embodiment of the method, the electrical consumer is operated outside the energy-saving mode with a prescribed heat output. In the energy-saving mode, the electrical consumer is operated with a reduced heat output compared with the prescribed heat output. This makes it possible in a particularly simple manner to operate the electrical consumer in energy-saving mode. This further enables more rapid availability of the electrical consumer after autonomous actuation of the internal combustion engine. The electrical consumer, which in normal operation is operated with the prescribed heat output is, for example, a gas sensor and/or a device for heating a catalytic converter, an injector, a particle sensor and/or an induction manifold of the first drive motor.

In a further advantageous embodiment of the method, the electrical consumer includes a sensor. This can advantageously contribute to all functionalities of the motor vehicle being available upon the autonomous switching on of the first drive motor. Alternatively or additionally, the electrical consumer can comprise one or more actuators of the motor vehicle. The sensor is, for example, a gas sensor.

In a further advantageous embodiment of the method, the reduced heat output of the sensor is selected such that in energy-saving mode, a temperature of the sensor lies in the area of the sensor's activation temperature. This contributes, in a simple manner, to the sensor advantageously being once again ready for deployment as rapidly as possible, despite the active energy-saving mode, if the first drive motor is autonomously switched once again after the autonomous switching-off.

In a further advantageous embodiment of the method, the sensor is a lambda probe. This contributes to the fact that in the case of autonomous switching-on of the first drive motor, it is advantageously possible to minimize, as rapidly as possible, any emission of harmful substances from the first drive motor. Alternatively or additionally, the sensor cart be an NOX-sensor or an HC-sensor.

The advantageous embodiments of the method can, without further effort, be transferred to advantageous embodiments of the device.

BRIEF DESCRIPTION OF THE DRAWINGS

The invention is explained in greater detail in diagrammatic drawings, where:

FIG. 3 shows a first program for operation of the motor vehicle, and

FIG. 4 shows a second program for operation of the motor vehicle

Elements having the same construction or function are indicated throughout all the figures using the same reference characters.

DETAILED DESCRIPTION OF INVENTION

Figure 1:
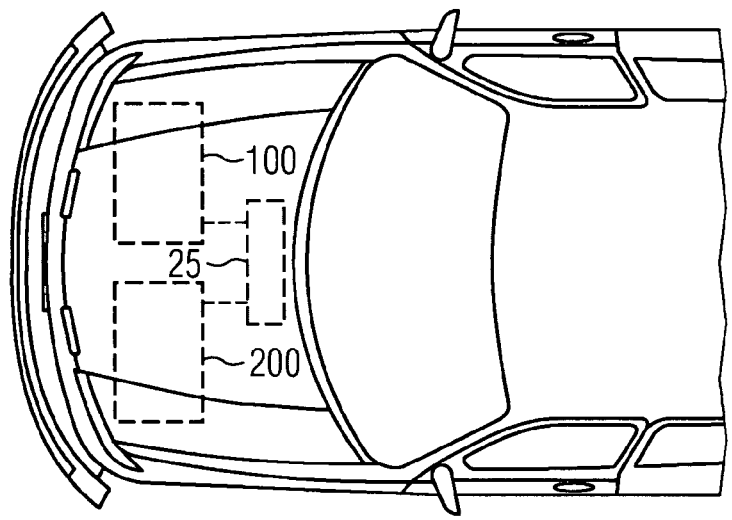
FIG. 1 shows a motor vehicle.

A motor vehicle (FIG. 1) comprises at least a first drive motor ENG_1 (FIG. 3). Additionally, the motor vehicle can comprise a second drive motor ENG_2. Preferably, the first drive motor ENG_1 is an internal combustion engine 100 and the second drive motor is preferably an electric motor 200. The first drive motor ENG_1 and if applicable the second drive motor ENG_2 are electrically coupled with a control device 25.

If the first and/or second drive motor ENG_1, ENG_2 are autonomously switched off by the control device 25, then an electrical consumer of the corresponding drive motor is operated in an energy-saving mode STATE_EGY_LOW. The control device 25 autonomously switches off the first and/or the second drive motor ENG_1, ENG_2 if the wheels of the motor vehicle are stationary, and if the motor vehicle is in neutral. Alternatively or additionally, the control device 25 can switch off the first or the second drive motor ENG_1, ENG_2 autonomously, if the second, or, as the case may be, first drive motor ENG_2, ENG_1, is switched on.

The electrical consumer is, for example, a sensor, and/or an actuator of the motor vehicle. The electrical consumer can, for example, be operated in the energy-saving mode STATE_EGY_LOW, if applicable by reducing a prescribed heat output of the electrical consumer to a prescribed lower heat output of the electrical consumer.

Figure 2:
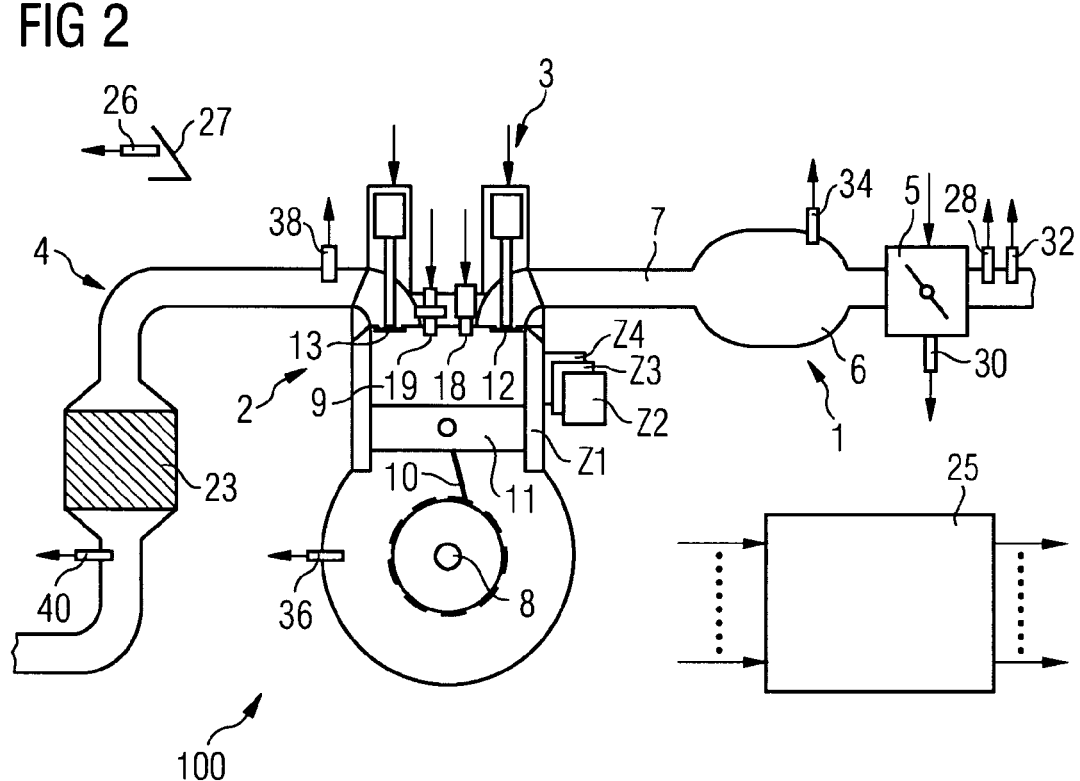
FIG. 2 shows an internal combustion engine.

The internal combustion engine 100 (FIG. 2) comprises an intake tract 1, an engine block 2, a cylinder head 3 and an exhaust gas tract 4. The intake tract 1 preferably comprises a throttle valve, a collector 6 and an induction manifold 7, which is directed towards a cylinder Z1-Z4 via an induction port into a combustion chamber 9 of the engine block 2. The engine block 2 comprises a crankshaft 8, which is coupled with the piston 11 of the cylinder Z1-Z4 via a connecting rod 10. As well as the cylinder Z1-Z4, the internal combustion engine preferably comprises further cylinders Z1-Z4. The internal combustion engine is preferably arranged in the motor vehicle.

An injection valve 18 and a spark plug 19 are preferably arranged in the cylinder head 3. Alternatively, the injection valve 18 can also be arranged in the induction manifold 7. An exhaust gas catalytic converter 23, preferably embodied as a three-way catalytic converter, is preferably arranged in the exhaust gas tract 4.

Sensors are assigned to the control device 25 which record different measured variables, and in each case determine the value of the measured variable. Operating values comprise the measured variables, and the values relating to the internal combustion engine derived from these. Operating values can be representative of the current operating status of the internal combustion engine. Dependent upon at least one of the operating values, the control device 25 determines a setting value, which is then converted into one or more input signals to control the actuators by means of corresponding actuating drives. The control device can also be designated as a mechanism for operation of the motor vehicle. Alternatively or additionally, a further mechanism can be provided for operation of the motor vehicle.

The sensors are, for example, a pedal position sensor 26, which records the position of a gas pedal 27, an air mass sensor 28, which records an air mass flow upstream of the throttle valve 5, a temperature sensor 32 which records an induction air temperature, an induction manifold pressure sensor 34, which records an induction manifold pressure in the manifold 6, a crankshaft angle sensor 36, which records a crankshaft angle, to which is then assigned a rotational speed of the internal combustion engine. An exhaust gas probe 38 is further arranged downstream of the gas outlet valve 13 and upstream of the exhaust gas catalytic converter 23, and an exhaust gas probe 40 is arranged downstream of the exhaust gas catalytic converter 23. These record, for example, a residual oxygen content of the exhaust gas, the measurement signal of which is characteristic of an air/fuel ratio in the combustion chamber 9 of the cylinder Z1-Z4. The exhaust gas probe 38 downstream of the gas outlet valve 13 and upstream of the exhaust gas catalytic converter 23, and the exhaust gas probe 40 downstream of the exhaust gas catalytic converter 23 can, for example, be lambda probes.

Depending on the form of embodiment of the invention, any desired subset of the aforementioned sensors can be provided, or additional sensors may also be available.

The actuators are, for example, the throttle valve 5, the gas inlet and gas outlet valve 12, 13, the injection valve 18 and/or the spark plug 19.

The exhaust gas probes require, on a regular basis, and particularly if they comprise a lambda probe, a prescribed temperature TEMP, in order that by means of them, prescribed proportions of gas in the exhaust gas from the internal combustion engine 100 can be determined. The prescribed reduced heat output is then preferably selected such that in the energy-saving mode STATE_EGY_LOW, the temperature TEMP of the appropriate exhaust gas probe lies in the range of an activation temperature of the relevant exhaust gas probe. Upon autonomous switching-on of the internal combustion engine 100, the exhaust gas probe is thereby either immediately ready for deployment, or at least is capable of full deployment very shortly after autonomous switching-on of the internal combustion engine 100. This contributes to the fact that at least shortly after autonomous switching-on of the internal combustion engine 100, the harmful emissions from said internal combustion engine can advantageously be optimally regulated.

Particularly when using a linear lambda probe as the exhaust gas probe, it is possible to select between two prescribed reduced heat outputs. A first prescribed reduced heat output ensures that the lambda probe is kept at the temperature TEMP, which lies above a threshold value for deactivation of a reference pump current regulator. A second prescribed reduced heat output can be selected such that the temperature TEMP of the lambda probe lies in the range of a temperature threshold for activation of a pump stream for lambda measurement. If the first prescribed reduced heat output is used for the energy-saving mode STATE_EGY_LOW, the lambda probe then requires around 3 to 5 seconds before it is ready for deployment once more. If the second prescribed reduced heat output is used for the energy-saving mode STATE_EGY_LOW, the lambda probe is already again ready for deployment after just one to two seconds. If the heat output selected is greater than or equal to the second prescribed lower heat output, the lambda probe remains ready for deployment even while the internal combustion engine 100 is autonomously switched off. Alternatively, the heat output of the lambda probe can be completely switched off, resulting in maximum reduction of the heat output. The lambda probe is then ready for deployment once more after approx. 10 seconds. The temperature TEMP of the linear lambda probe is preferably operated with closed-loop regulation.

In the case of a binary lambda probe, a reduced heat output is preferably prescribed. Further, the binary lambda probe is preferably precontrolled and/or operated with open-loop regulation.

A first program for operation of the motor vehicle is preferably stored on a storage medium of the control device 25. The first program (FIG. 3) serves to switch the internal combustion engine 100 into the energy-saving mode STATE_

EGY_LOW. The first program is preferably started with a step S1, in which, if applicable, variables are initialized.

In a step S2, a check is performed as to whether the first drive motor ENG_1 is switched off autonomously. If the condition of step S2 is not met, processing is continued with step S1. If the condition of step S2 is met, processing is continued with step S3.

In step S3, the first drive motor ENG_1 is operated in energy-saving mode STATE_EGY_LOW.

In a step S4, the first program can be terminated. Preferably, however, the first program is regularly executed outside the energy-saving mode STATE_EGY_LOW.

Alternatively or additionally, a second program (FIG. 4) for operation of the motor vehicle is stored on the storage medium of the control device 25. The second program serves to operate the electrical consumer in the energy-saving mode STATE_EGY_LOW in the case of autonomous switching-off of the internal combustion engine 100, in particular by reducing the prescribed heat output of the electrical consumer to the prescribed reduced heat output. The second program is preferably started with a step S5 in which, if applicable, variables are initialized.

In a step S6, a check is performed as to whether a switch-off value DEACT is set, which is representative of whether the first drive motor ENG_1 is autonomously switched off if the condition of step S6 is met, the processing is continued with a step S7. If the condition of step S6 is not met, the processing is continued with a step S10.

In a step S7, a check is performed as to whether the temperature TEMP of the exhaust gas probe is lower than a prescribed lower threshold value THD_LOW. If the condition of step S7 is not met, processing is continued with step S8. If the condition of step S7 is met, processing is continued with step S9.

In step S8, a reduction RED of the temperature TEMP of the exhaust gas probe is performed, preferably by lowering the prescribed heat output of the exhaust gas probe to the prescribed reduced heat output of the exhaust gas probe.

In step S9, a hold operation HOLD is effected on the temperature TEMP of the exhaust probe, preferably by closed-loop regulation.

In step S10, a check is performed as to whether the temperature TEMP is higher than a prescribed upper threshold THD_HIGH. If the condition of step S10 is met, processing is continued with step S9. If the condition of step S10 is not met, processing is continued with step S11.

In step S11, an increase INC in the temperature TEMP is effected.

In a step S12, the second program can be terminated. Preferably, however, the second program is regularly executed during operation of the motor vehicle.

The invention is not restricted to the exemplary embodiments cited. For example any electrical consumer desired which is operated with an electrical output can be operated in the energy-saving mode STATE_EGY_LOW. Further, alternatively or additionally to the heat output, any other electrical output for operation of the electrical consumer can be reduced in the energy-saving mode. Further, the linear lambda probe can be operated with just one prescribed reduced heat output and/or precontrolled and/or with the closed-loop regulation.

The invention claimed is:

1. A method for the operation of a motor vehicle having a first drive motor, comprising:
   autonomously switching-off of the first drive motor independently from an intentional switching-off of the first drive motor by a driver of the motor vehicle; and
   operating an electrical consumer of the first drive motor in an energy-saving mode,
   wherein
   outside the energy-saving mode, the electrical consumer is operated with a prescribed heat output, and
   inside the energy-saving mode, the electrical consumer is operated with a reduced heat output compared to the prescribed heat output.

2. The method as claimed in claim 1, wherein the first drive motor is switched off autonomously if the first drive motor is operated in neutral and the motor vehicle's wheels are stationary.

3. The method as claimed in claim 2, wherein the motor vehicle further comprises a second drive motor and the first drive motor is switched off autonomously if a second drive motor of the motor vehicle is started.

4. The method as claimed in claim 1, wherein the electrical consumer comprises a sensor.

5. The method as claimed in claim 4, wherein the reduced heat output of the sensor is selected such that in the energy-saving mode, a temperature of the sensor lies in the range of an activation temperature of the sensor.

6. The method as claimed in claim 5, wherein the sensor is a lambda probe.

7. The method as claimed in claim 6, wherein the first drive motor is an internal combustion engine.

8. The method as claimed in claim 7, wherein the second drive motor is an electric motor.

9. A device for controlling operation of a motor vehicle having a first drive motor, comprising:
   a switch that autonomously switches-off a first drive motor independent from an intentional switching-off of the first drive motor by a driver of the motor vehicle; and
   a controller that operates an electrical consumer of the first drive motor in an energy saving mode after the autonomous switching-off of the drive motor,
   wherein
   outside the energy-saving mode, the electrical consumer is operated with a prescribed heat output, and
   inside the energy-saving mode, the electrical consumer is operated with a reduced heat output compared to the prescribed heat output.

10. The device as claimed in claim 9, wherein the first drive motor is switched off autonomously if the first drive motor is operated in neutral and the motor vehicle's wheels are stationary.

11. The device as claimed in claim 10, wherein the motor vehicle further comprises a second drive motor and the first drive motor is switched off autonomously if a second drive motor of the motor vehicle is started.

12. The device as claimed in claim 9, wherein the electrical consumer comprises a sensor.

13. The device as claimed in claim 12, wherein the reduced heat output of the sensor is selected such that in the energy-saving mode, a temperature of the sensor lies in the range of an activation temperature of the sensor.

14. The device as claimed in claim 13, wherein the sensor is a lambda probe.

15. The device as claimed in claim 14, wherein the first drive motor is an internal combustion engine.

16. The device as claimed in claim 15, wherein the second drive motor is an electric motor.

* * * * *